US010459581B2

(12) United States Patent
Amer et al.

(10) Patent No.: US 10,459,581 B2
(45) Date of Patent: Oct. 29, 2019

(54) INPUT SENSING USING LOWER-ORDER CDM

(71) Applicant: Synaptics Incorporated, San Jose, CA (US)

(72) Inventors: Nooreldin Amer, Rochester, NY (US); David Hinterberger, Rochester, NY (US)

(73) Assignee: Synaptics Incorporated, San Jose, CA (US)

( * ) Notice: Subject to any disclaimer, the term of this patent is extended or adjusted under 35 U.S.C. 154(b) by 89 days.

(21) Appl. No.: 15/720,817

(22) Filed: Sep. 29, 2017

(65) Prior Publication Data

US 2019/0101999 A1    Apr. 4, 2019

(51) Int. Cl.
*G06F 3/044* (2006.01)
*G06K 9/00* (2006.01)
*G06F 3/041* (2006.01)
*G06F 3/043* (2006.01)

(52) U.S. Cl.
CPC ............ *G06F 3/044* (2013.01); *G06F 3/0416* (2013.01); *G06F 3/0446* (2019.05); *G06F 3/04166* (2019.05); *G06K 9/0002* (2013.01); *G06F 3/043* (2013.01)

(58) Field of Classification Search
CPC .... G06F 3/044; G06F 3/0416; G06F 3/04166; G06F 3/0446; G06F 3/043; G06K 9/0002
See application file for complete search history.

(56) References Cited

U.S. PATENT DOCUMENTS

| 2011/0074723 | A1* | 3/2011 | Reynolds | G06F 3/041 345/173 |
| 2013/0127779 | A1* | 5/2013 | Lillie | G06F 3/0416 345/174 |
| 2014/0062898 | A1* | 3/2014 | Singh | G06F 1/3262 345/173 |
| 2014/0267143 | A1* | 9/2014 | Worfolk | G06F 3/044 345/174 |
| 2014/0267349 | A1* | 9/2014 | Lee | G06F 3/044 345/589 |

* cited by examiner

*Primary Examiner* — Amare Mengistu
*Assistant Examiner* — Jennifer L Zubajlo
(74) *Attorney, Agent, or Firm* — Leydig, Voit & Mayer, Ltd.

(57) ABSTRACT

A method for performing input sensing using an input device includes: receiving, at a sensing region of the input device, an input; obtaining, via receivers of the input device, measurements corresponding to the input, wherein obtaining the measurements comprises: separately driving multiple subsets of transmitters of the input device, and obtaining measurements corresponding to each separately-driven subset of transmitters via the receivers, wherein each separately-driven subset of transmitters comprises a plurality of non-contiguous transmitters; and generating, by a processing system of the input device, an image of the input based on the obtained measurements.

18 Claims, 17 Drawing Sheets

INPUT SENSING USING LOWER-ORDER CDM

BACKGROUND

Input devices, including touch sensor devices (also commonly called touchpads or proximity sensor devices), as well as fingerprint sensor devices, are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

In an exemplary embodiment, a method is provided for performing input sensing using an input device. The method includes: receiving, at a sensing region of the input device, an input; obtaining, via receivers of the input device, measurements corresponding to the input, wherein obtaining the measurements comprises: separately driving multiple subsets of transmitters of the input device, and obtaining measurements corresponding to each separately-driven subset of transmitters via the receivers, wherein each separately-driven subset of transmitters comprises a plurality of non-contiguous transmitters; and generating, by a processing system of the input device, an image of the input based on the obtained measurements.

In another exemplary embodiment an input device is provided, which includes: a surface corresponding to a sensing region, wherein the sensing region is configured to receive an input; transmitters, configured to be driven with transmitter signals; and receivers, configured to obtain measurements corresponding to the input, wherein obtaining the measurements comprises: obtaining measurements corresponding to separately-driven subsets of transmitters via the receivers, wherein each separately-driven subset of transmitters comprises a plurality of non-contiguous transmitters; and a processing system, configured to generate an image of the input based on the obtained measurements.

In yet another exemplary embodiment, a non-transitory computer-readable medium is provided having processor-executable instructions stored thereon for performing input sensing using an input device. The processor-executable instructions, when executed, facilitate performance of the following: obtaining, via receivers of the input device, measurements corresponding to an input received at a sensing region of the input device, wherein obtaining the measurements comprises: separately driving multiple subsets of transmitters of the input device, and obtaining measurements corresponding to each separately-driven subset of transmitters via the receivers, wherein each separately-driven subset of transmitters comprises a plurality of non-contiguous transmitters; and generating an image of the input based on the obtained measurements.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Many touch sensor devices and fingerprint sensor devices utilize transcapacitive sensing techniques in connection with a plurality of transmitter and receiver electrodes. In order to enhance the signal level, code division multiplexing (CDM) may be used with respect to transmitter signals driven onto the transmitter electrodes. In some conventional systems, the CDM order, corresponding to the amount of transmitters being simultaneously driven, is equivalent to the total number of transmitter electrodes such that all transmitter electrodes are simultaneously driven for a plurality of imaging iterations.

Exemplary systems and methods discussed herein provide for transcapacitive sensing techniques that utilize lower-order CDM relative to conventional transcapacitive CDM techniques (which utilize a CDM order equivalent to the total number of transmitter electrodes), so as to provide for various advantages relative to such conventional transcapacitive CDM techniques—including reduction in peak power, reduction in average power, reduction in sensor self-heating, and reduction in computational complexity. Further, these advantages may be achieved in a flexibly configurable manner to meet the desired power specifications for various implementations of touch sensor devices and fingerprint sensor devices.

Figure 1:
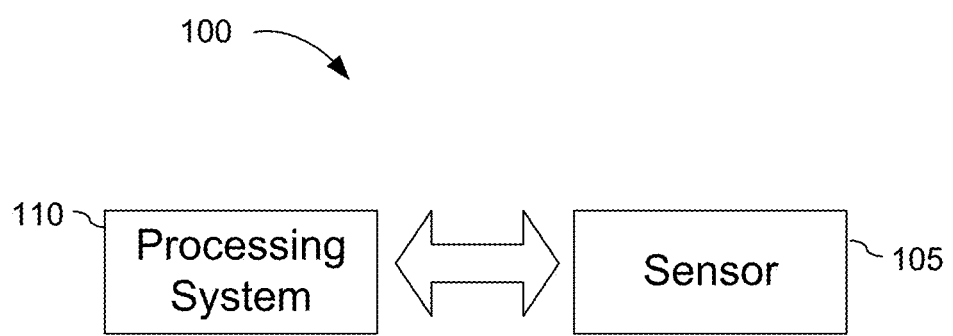
FIG. 1 is a block diagram depicting an example input device.

FIG. 1 is a block diagram depicting an example input device 100. The input device 100 may be configured to provide input to an electronic system. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region 120.

The input device 100 is a transcapacitive input device, wherein voltage or current is applied to create an electric field. Nearby input objects cause changes in the electric field, and produce detectable changes in capacitive coupling that may be detected as changes in voltage, current, or the like.

The transcapacitive input device utilizes arrays or other regular or irregular patterns of capacitive sensing elements to create electric fields. In some implementations, separate sensing elements may be ohmically shorted together to form larger sensor electrodes. Some other implementations may utilize resistive sheets, which may be uniformly resistive.

The transcapacitive input device utilizes "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
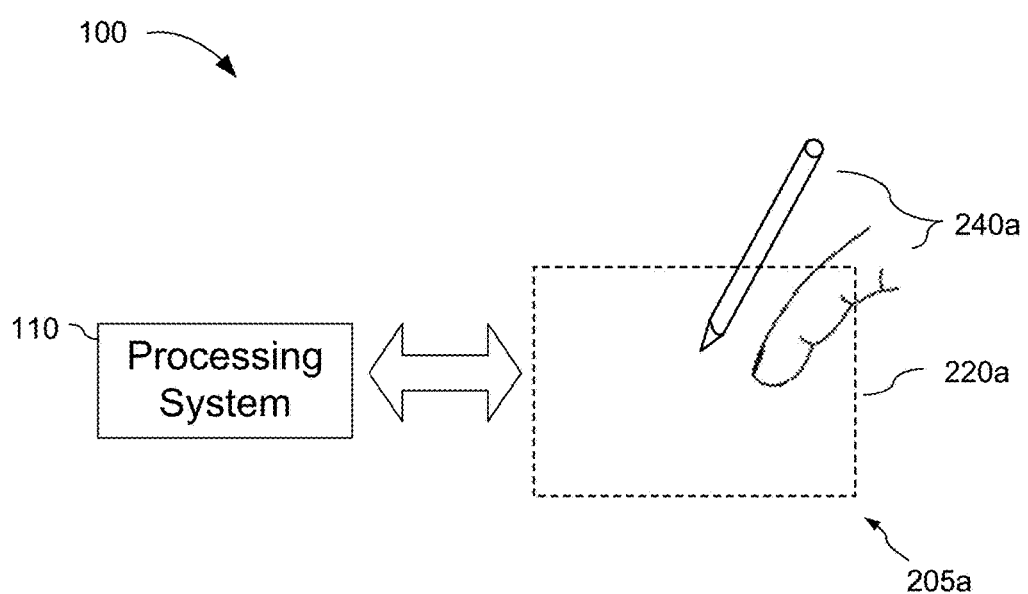
FIGS. 2A-2B are block diagrams depicting further exemplary input devices.
Figure 2B:
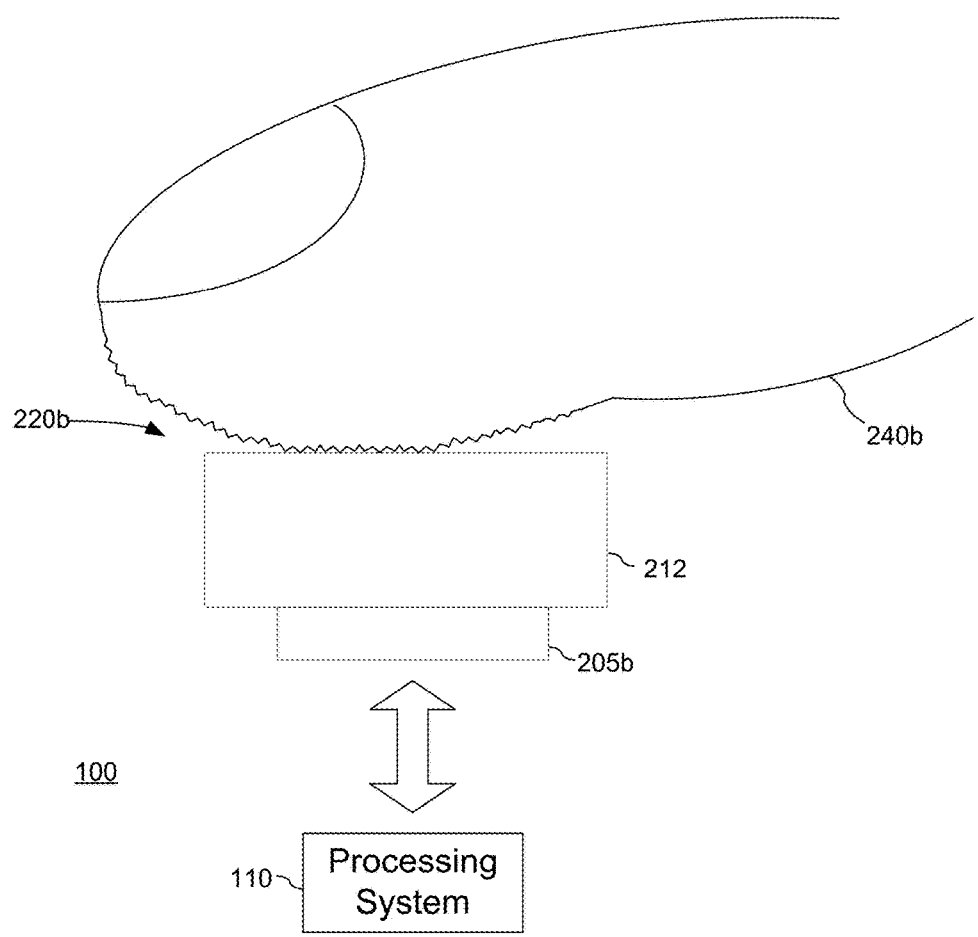

FIGS. 2A-2B are block diagrams depicting further exemplary input devices. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

Figure 3:
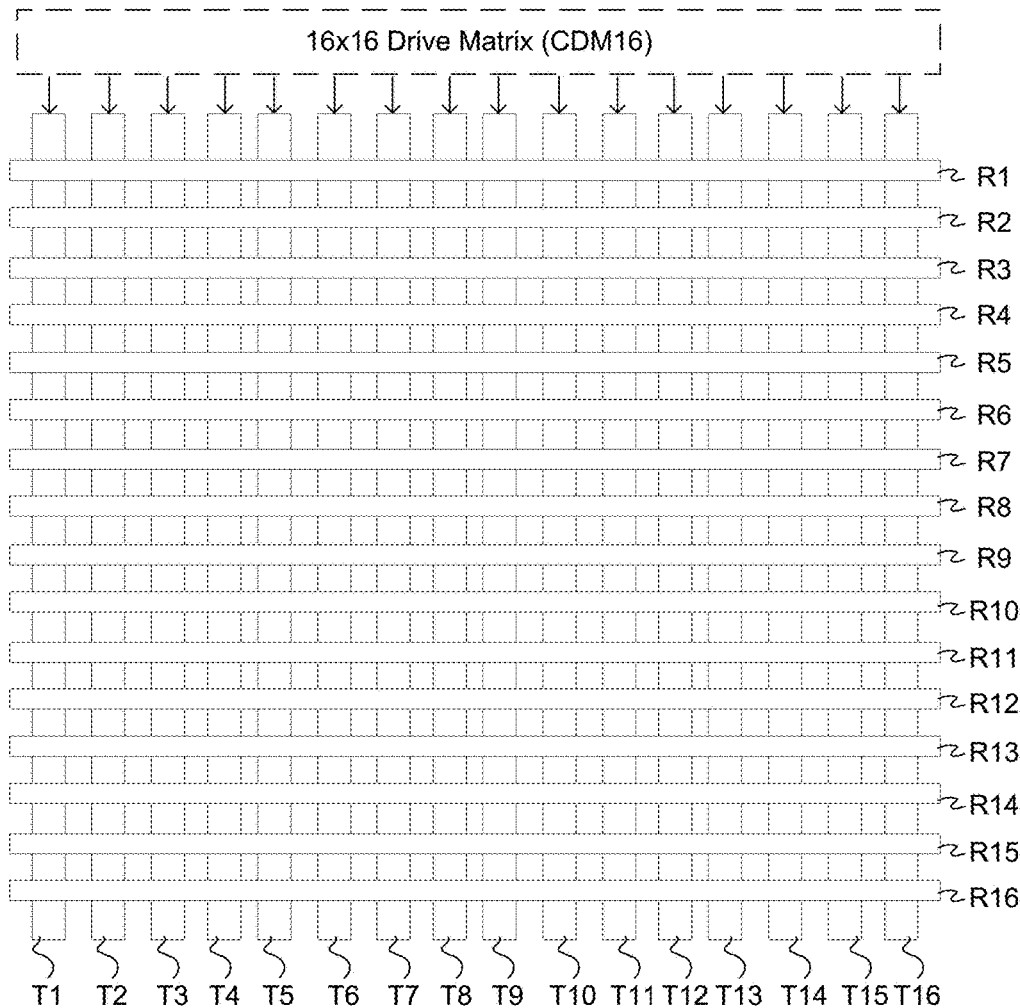
FIG. 3 depicts an exemplary orthogonal grid of transmitter electrodes and receiver electrodes for a transcapacitive input device being driven by a 16×16 drive matrix.

FIG. 3 depicts an exemplary orthogonal grid of transmitter electrodes T1-T16 and receiver electrodes R1-R16 for a transcapacitive input device being driven by a 16×16 drive matrix. It will be appreciated that a 16×16 grid is shown for illustrative purposes, but that exemplary implementations of a transcapacitive input device may be of any size—including, for example, 56×96, 80×80, 88×116, 56×144, 72×80, etc. It will further be appreciated that although a grid with transmitter electrodes and receiver electrodes orthogonal to one another in a bars and stripes configuration is used herein as an example, other exemplary implementations of a transcapacitive input device may utilize other configurations of transmitter electrodes and receiver electrodes—including, for example, single-layer configurations with interdigitated electrodes, matrix configurations where each pixel corresponds to an electrode plate, orthogonal diamond configurations, etc.

As shown in FIG. 3, the transmitter electrodes T1-T16 are driven according to a CDM technique where the CDM order is 16 (CDM16) with all transmitter electrodes T1-T16 being simultaneously driven with different codings, each having a same rowsum, over 16 imaging iterations (corresponding to a 16×16 drive matrix). Thus, with all of transmitter electrodes T1-T16 being driven 16 times, this would result in relatively high peak power, average power, sensor self-heating, and computational complexity. The information captured through this CDM technique is then decoded using the inverse (for a non-zero rowsum drive matrix) or transpose (for a zero rowsum drive matrix) of the drive matrix to obtain an image corresponding to an input.

Figure 4A:
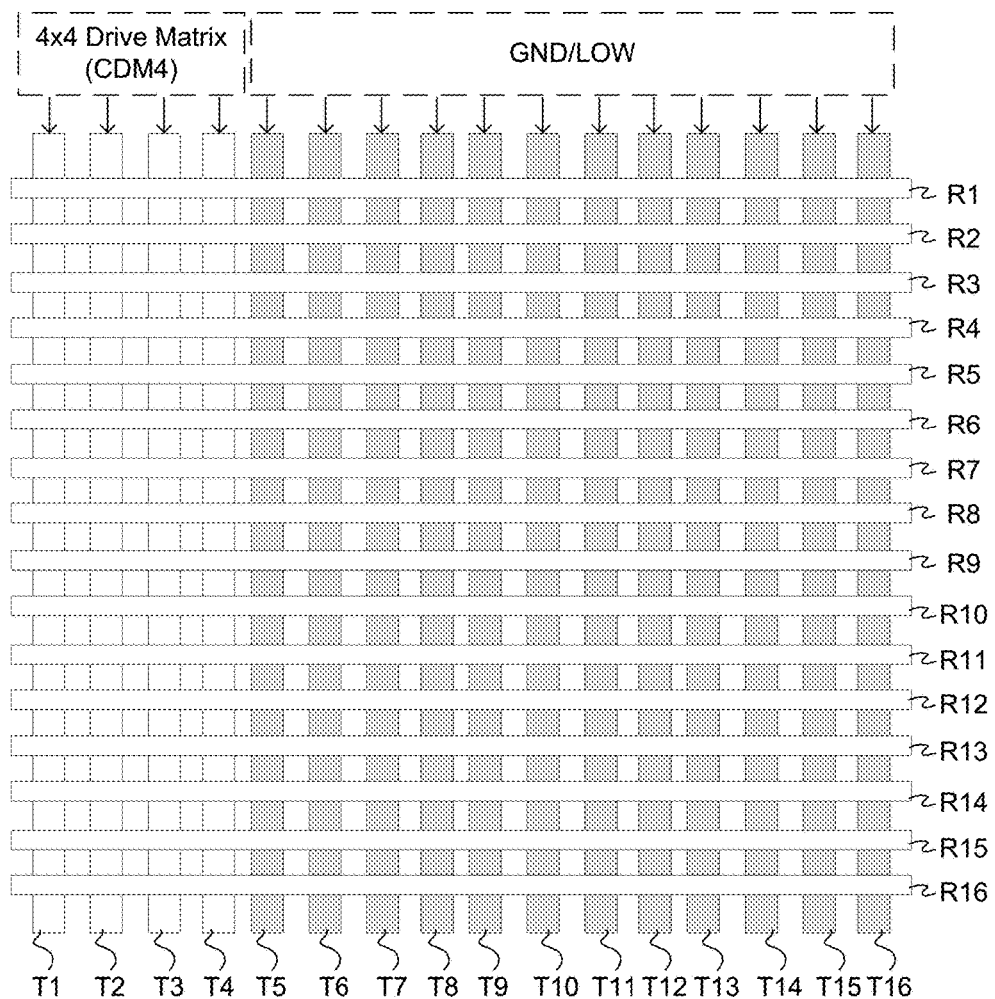
FIGS. 4A-4D depict an exemplary orthogonal grid of transmitter electrodes and receiver electrodes for a transcapacitive input device being driven via an example of a lower-order CDM technique using contiguous CDM groups.
Figure 4B:
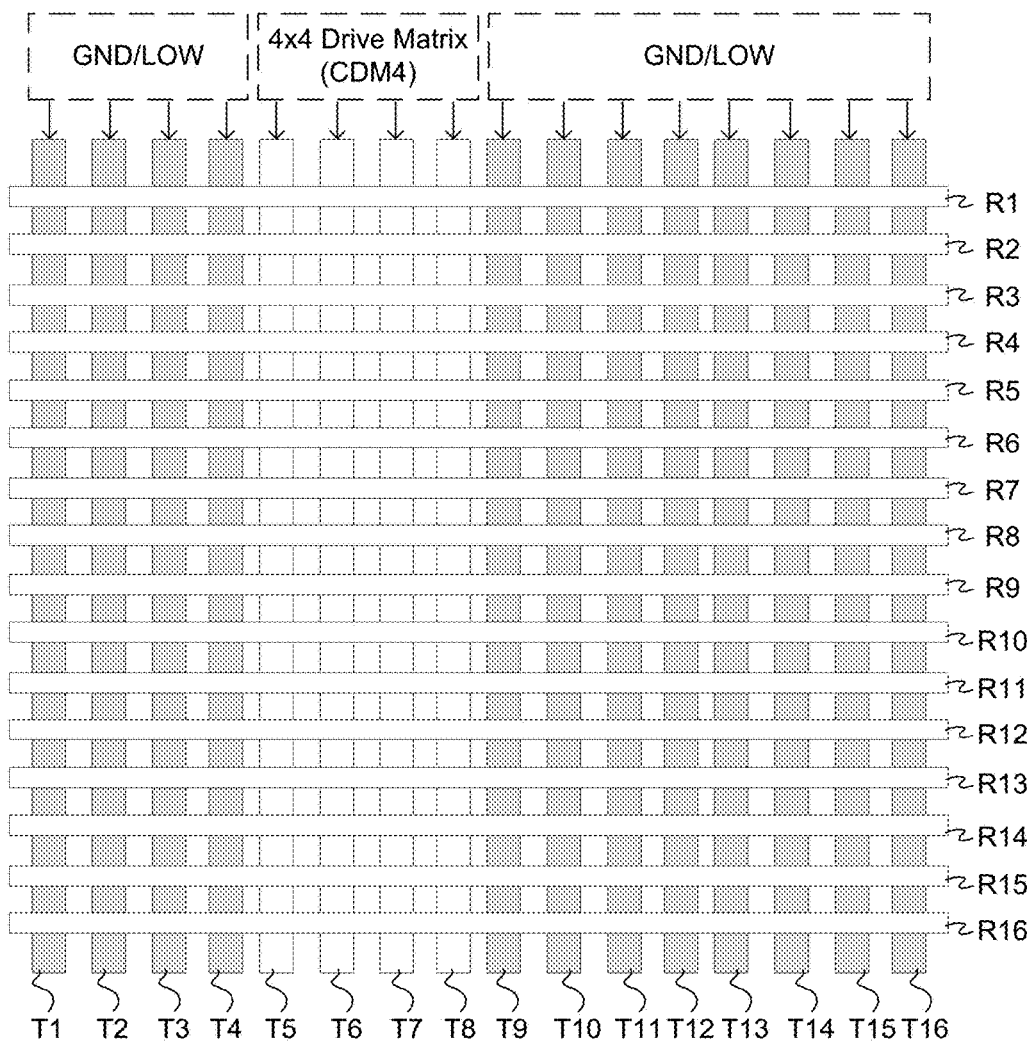
Figure 4C:
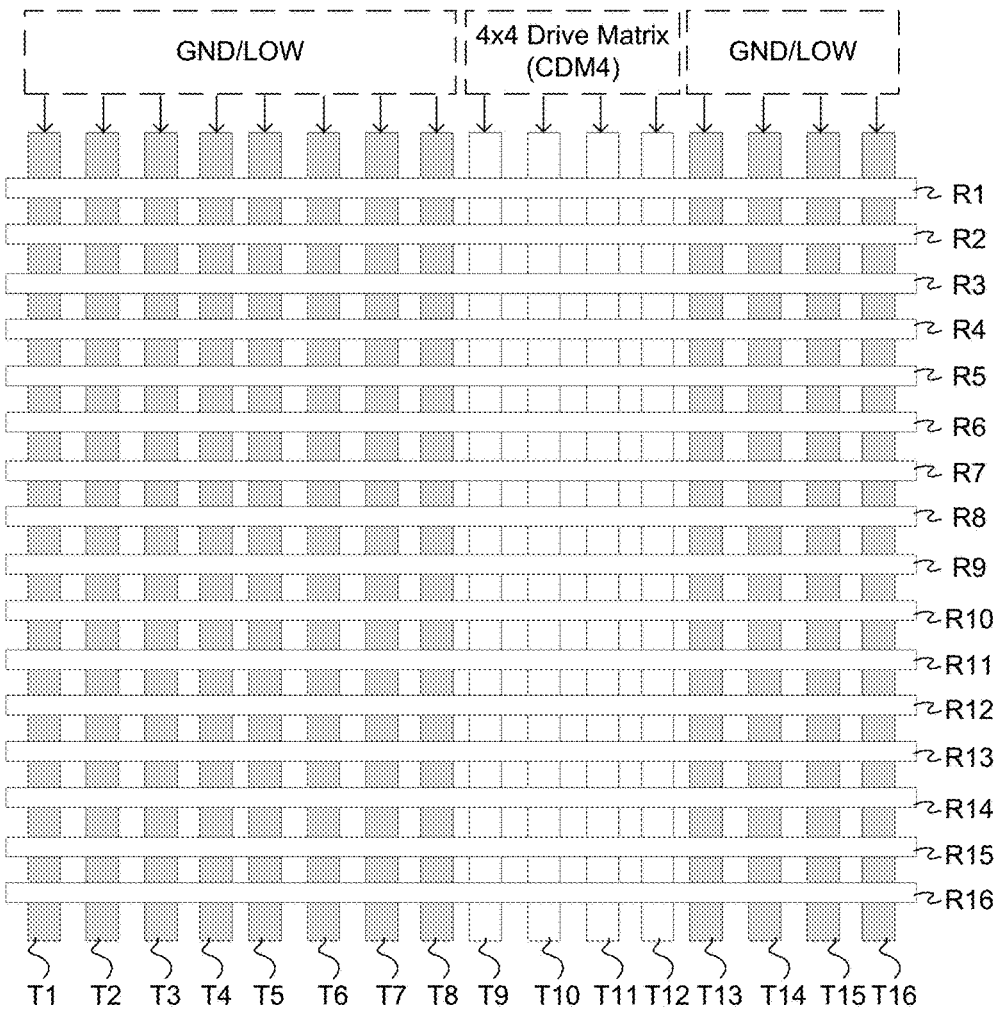
Figure 4D:
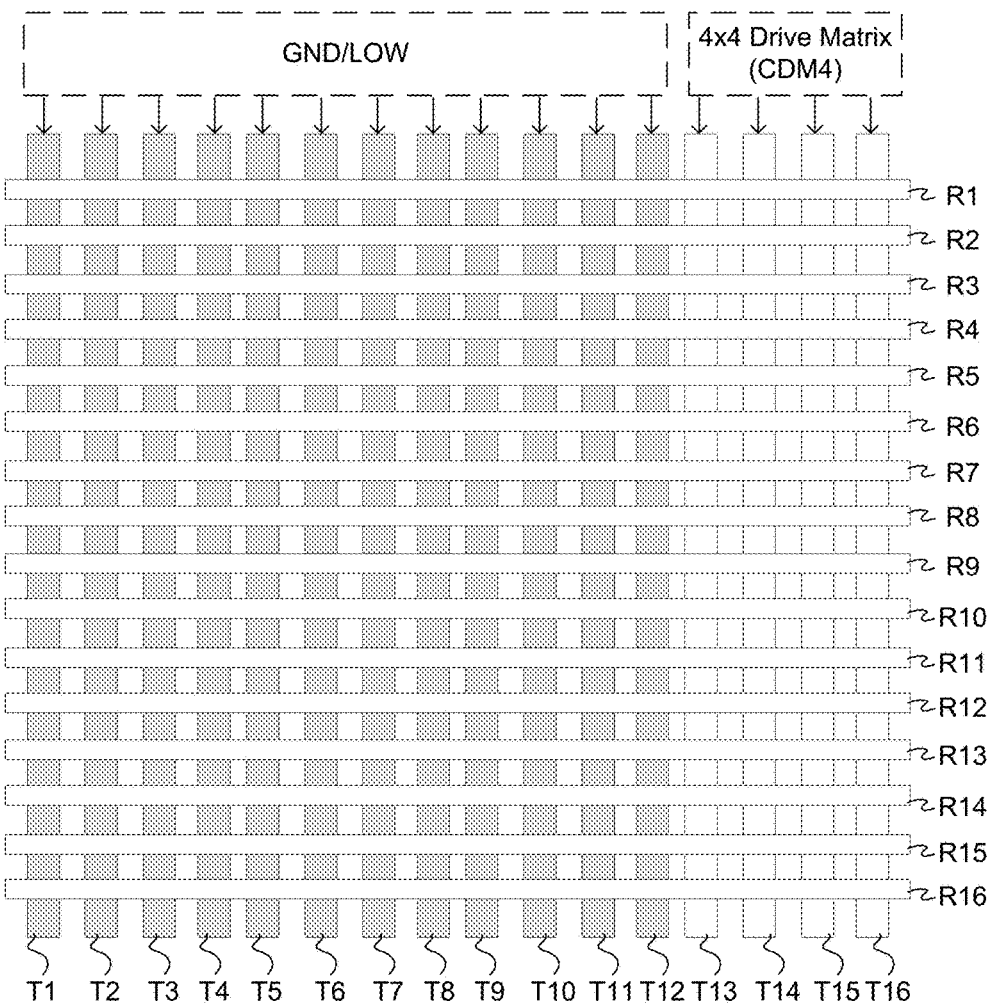

FIGS. 4A-4D depict an exemplary orthogonal grid of transmitter electrodes T1-T16 and receiver electrodes R1-R16 for a transcapacitive input device being driven via an example of a lower-order CDM technique using contiguous CDM groups. In particular, the example shown in FIGS. 4A-4D corresponds to a CDM order of 4 (CDM4) being used for 4 transmitter electrodes at a time for the 16×16 grid of transmitter electrodes. As shown in FIG. 4A, through a first set of four imaging iterations, corresponding to a $1^{st}$ CDM group, the transmitter electrodes T1-T4 are driven with transmitter signals having codings corresponding to a 4×4 drive matrix while the transmitter electrodes T5-T16 are grounded or held at a low reference potential. As shown in FIG. 4B, through a second set of four imaging iterations, corresponding to a $2^{nd}$ CDM group, the transmitter electrodes T5-T8 are driven with transmitter signals having codings corresponding to a 4×4 drive matrix while the transmitter electrodes T1-T4 and T9-T16 are grounded or held at a low reference potential. As shown in FIG. 4C, through a third set of four imaging iterations, corresponding to a $3^{rd}$ CDM group, the transmitter electrodes T9-T12 are driven with transmitter signals having codings corresponding to a 4×4 drive matrix while the transmitter electrodes T1-T8 and T13-T16 are grounded or held at a low reference potential. As shown in FIG. 4D, through a fourth set of four imaging iterations, corresponding to a $4^{th}$ CDM group, the transmitter electrodes T13-T16 are driven with transmitter signals having codings corresponding to a 4×4 drive matrix while the transmitter electrodes T1-T12 are grounded or held at a low reference potential.

The 4×4 drive matrix corresponding to each of the CDM groups shown in FIGS. 4A-4D may be, for example:

$$\begin{bmatrix} 0 & 0 & 0 & 0 \\ +1 & +1 & -1 & -1 \\ +1 & -1 & +1 & -1 \\ -1 & +1 & +1 & -1 \end{bmatrix}$$

It will be appreciated that each row of the drive matrix corresponds to a different imaging iteration of the respective CDM group, and that the rows may be rearranged to be performed in any order. It will also be appreciated that the same 4×4 drive matrix may be used for each respective CDM group. Further, it will be appreciated that the 16 imaging iterations shown in FIGS. 4A-4D may be performed in any order.

It will further be appreciated that although the foregoing example sets forth a drive matrix with rowsum zero, these principles may also be used with respect to non-zero drive matrices. For example, in other exemplary embodiments, a CDM drive matrix may be constructed with codings having rowsum greater than zero, with different codings corresponding to the same constant non-zero rowsum being used throughout the different iterations corresponding to the CDM drive matrix.

Figure 5:
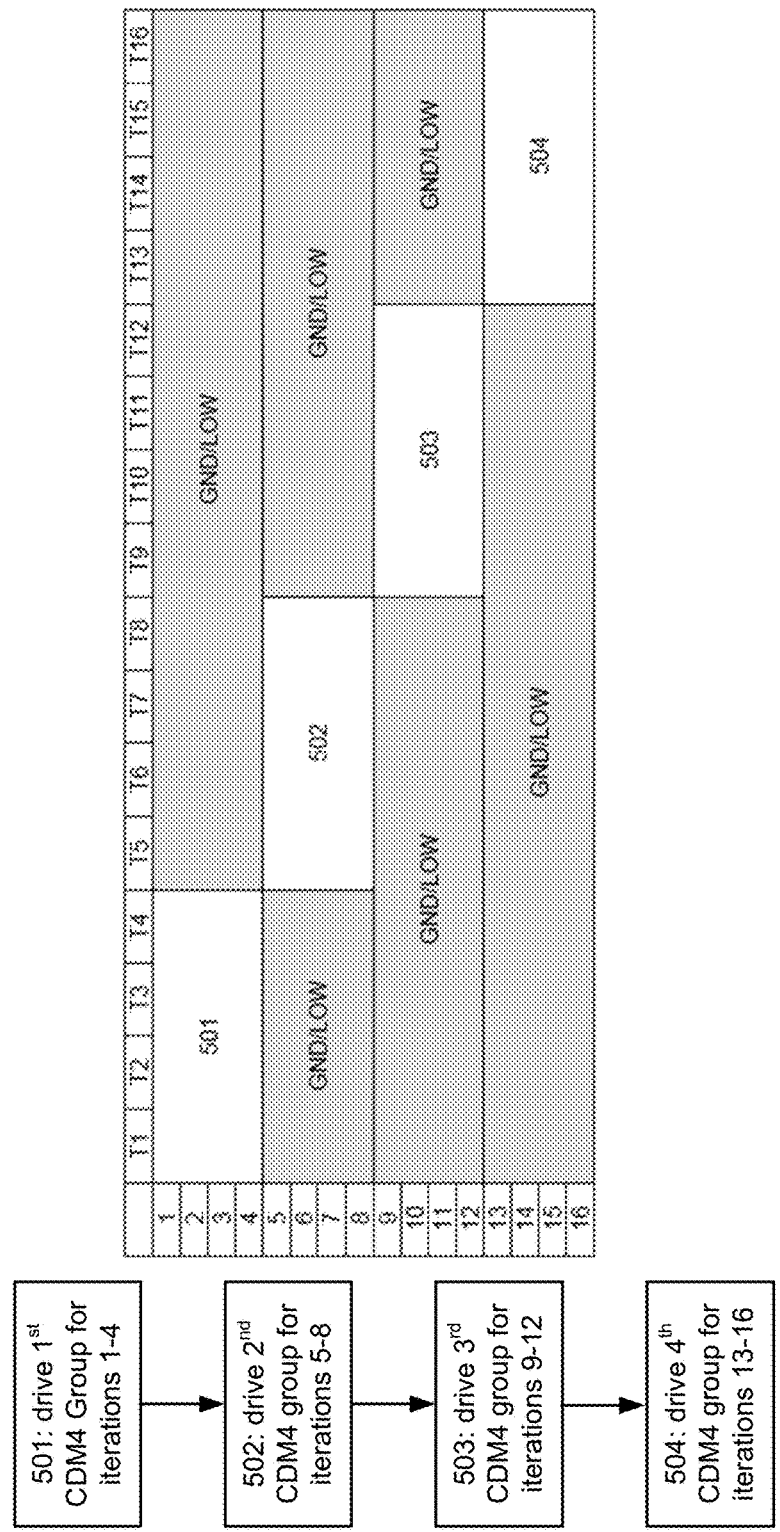
FIG. 5 is a flowchart with a corresponding table that schematically illustrates an example of the imaging iterations of FIGS. 4A-4D being performed in one exemplary sequence.

FIG. 5 is a flowchart with a corresponding table that schematically illustrates an example of the 16 imaging iterations of FIGS. 4A-4D being performed in one exemplary sequence. At stage 501, through a first set of four imaging iterations (1-4), a CDM4 drive matrix is applied to a $1^{st}$ CDM group (transmitter electrodes T1-T4). At stage 502, through a second set of four imaging iterations (5-8), a CDM4 drive matrix is applied to a $2^{nd}$ CDM group (transmitter electrodes T5-T8). At stage 503, through a third set of four imaging iterations (9-12), a CDM4 drive matrix is applied to a $3^{rd}$ CDM group (transmitter electrodes T9-T12). At stage 504, through a first set of four imaging iterations (13-16), a CDM4 drive matrix is applied to a $4^{th}$ CDM group (transmitter electrodes T13-T16).

The example shown above in FIGS. 4A-4D and FIG. 5 thus utilize lower-order CDM and achieve a reduction in peak power, reduction in average power, and a reduction in sensor self-heating, as well as a reduction in computational complexity for recovering the image from the detected resulting signals from the receiver electrodes. And, it will be appreciated that the number of CDM groups and the number of transmitter electrodes per CDM group may be adjusted in a flexibly configurable manner to meet the desired power specifications for various implementations of touch sensor devices and fingerprint sensor devices.

Figure 6:
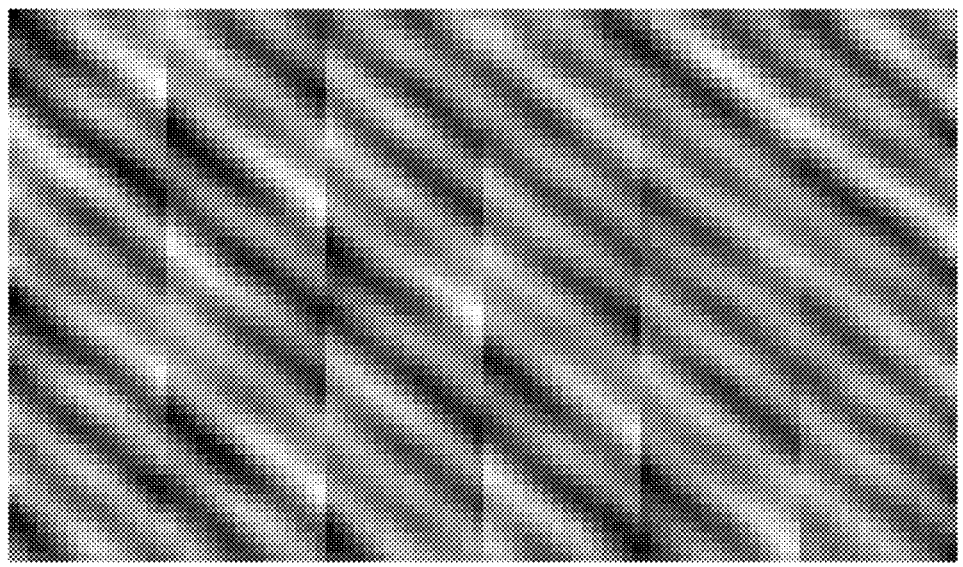
FIG. 6 is an exemplary image captured using lower-order CDM with six contiguous CDM16 groups for a 56×96 transcapacitive input device with 175 μm glass coating.

FIG. 6 is an exemplary image, prior to image processing operations to smooth the seams in the image, captured using lower-order CDM with six contiguous CDM16 groups for a 56×96 transcapacitive input device with 175 μm glass coating in a manner similar to the example discussed above with respect to FIGS. 4A-4D and FIG. 5 (which involved four contiguous CDM groups). As can be seen in FIG. 6, there is a seam at each of the boundaries between adjacent CDM groups due to disparate average values corresponding to each respective CDM group affecting the imaging operations performed with respect to each CDM group.

FIGS. 7A-7D and FIG. 8 depict an exemplary lower-order CDM technique which may be used to avoid the appearance of seams shown in FIG. 6. In FIGS. 7A-7D and FIG. 8, the transcapacitive input device uses non-contiguous CDM groups so as to avoid the appearance of boundaries between adjacent CDM groups. Since the transmitter electrodes of the non-contiguous CDM groups are spread out over the sensing array, the average values corresponding to each respective CDM group are relatively closer to one another.

Figure 7A:
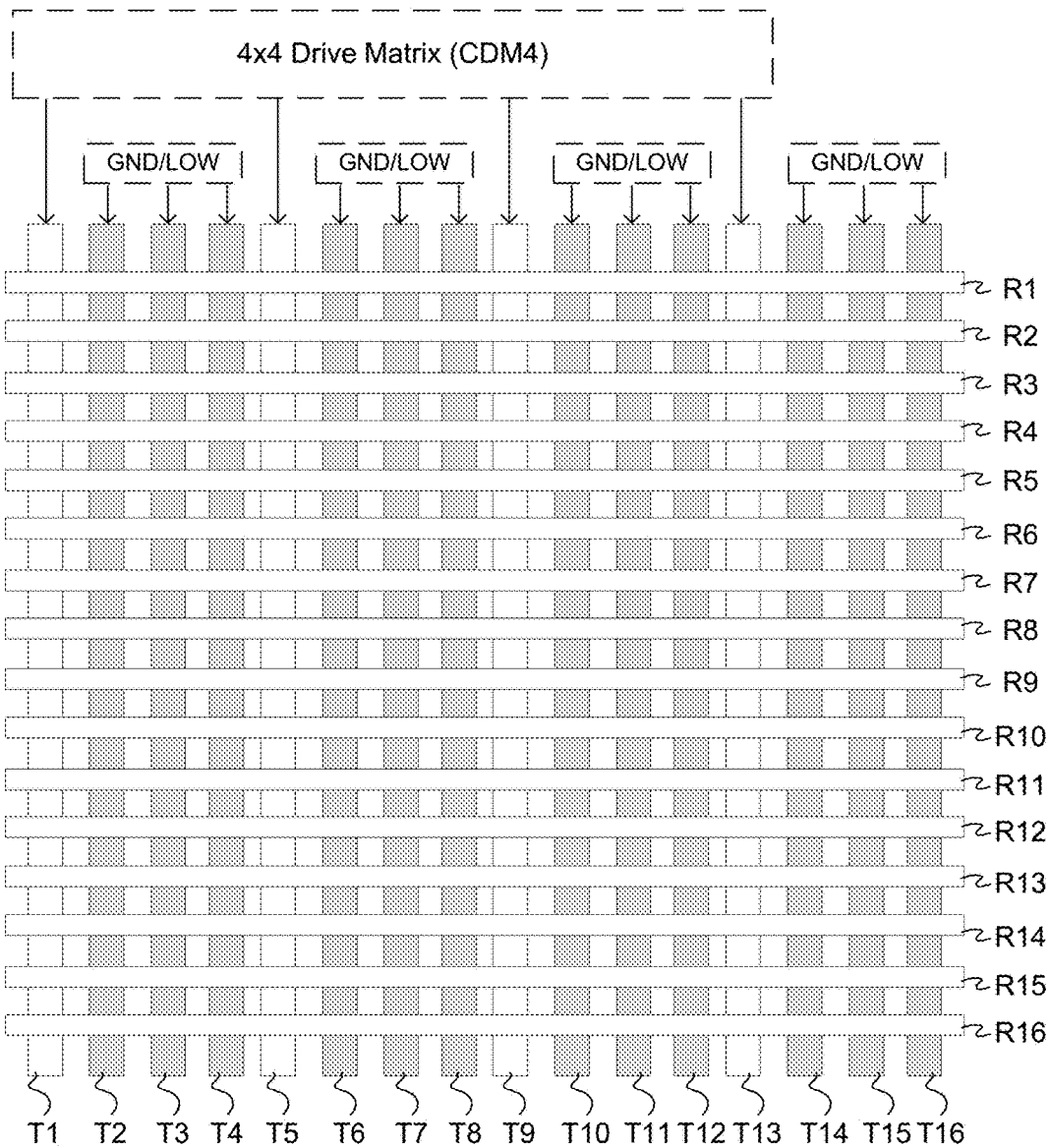
FIGS. 7A-7D depict an exemplary orthogonal grid of transmitter electrodes and receiver electrodes for a transcapacitive input device being driven via an example of a lower-order CDM technique using non-contiguous CDM groups.
Figure 7B:
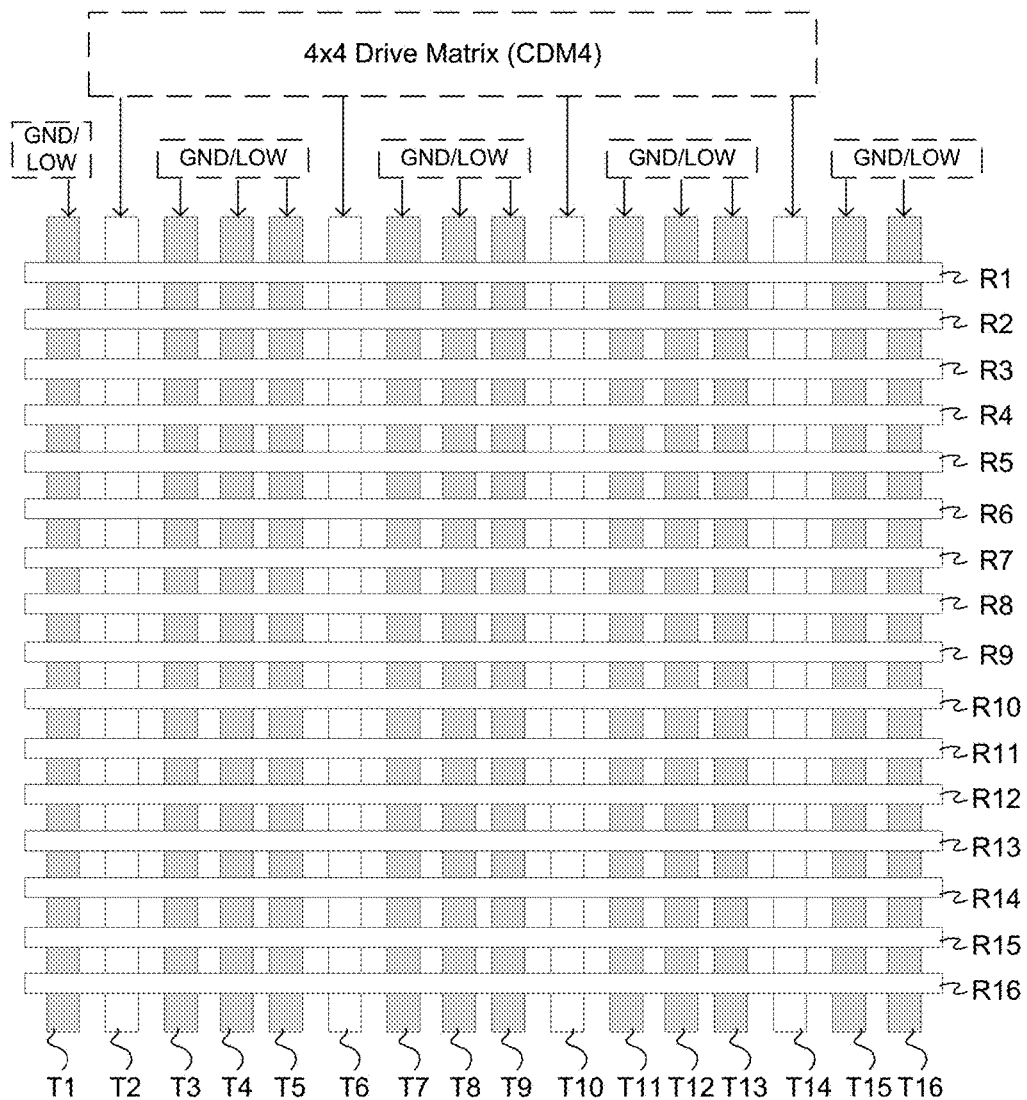
Figure 7C:
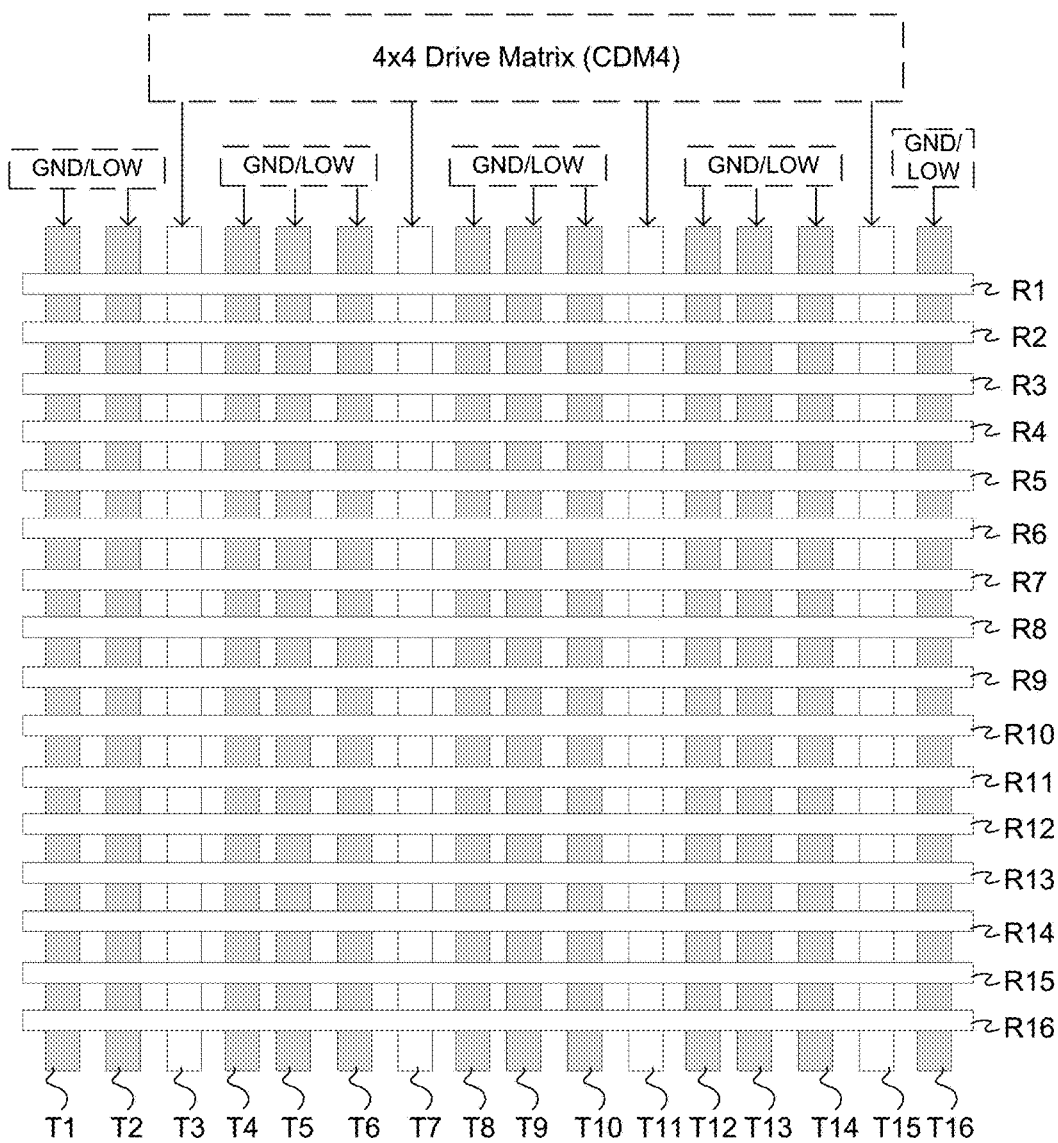
Figure 7D:
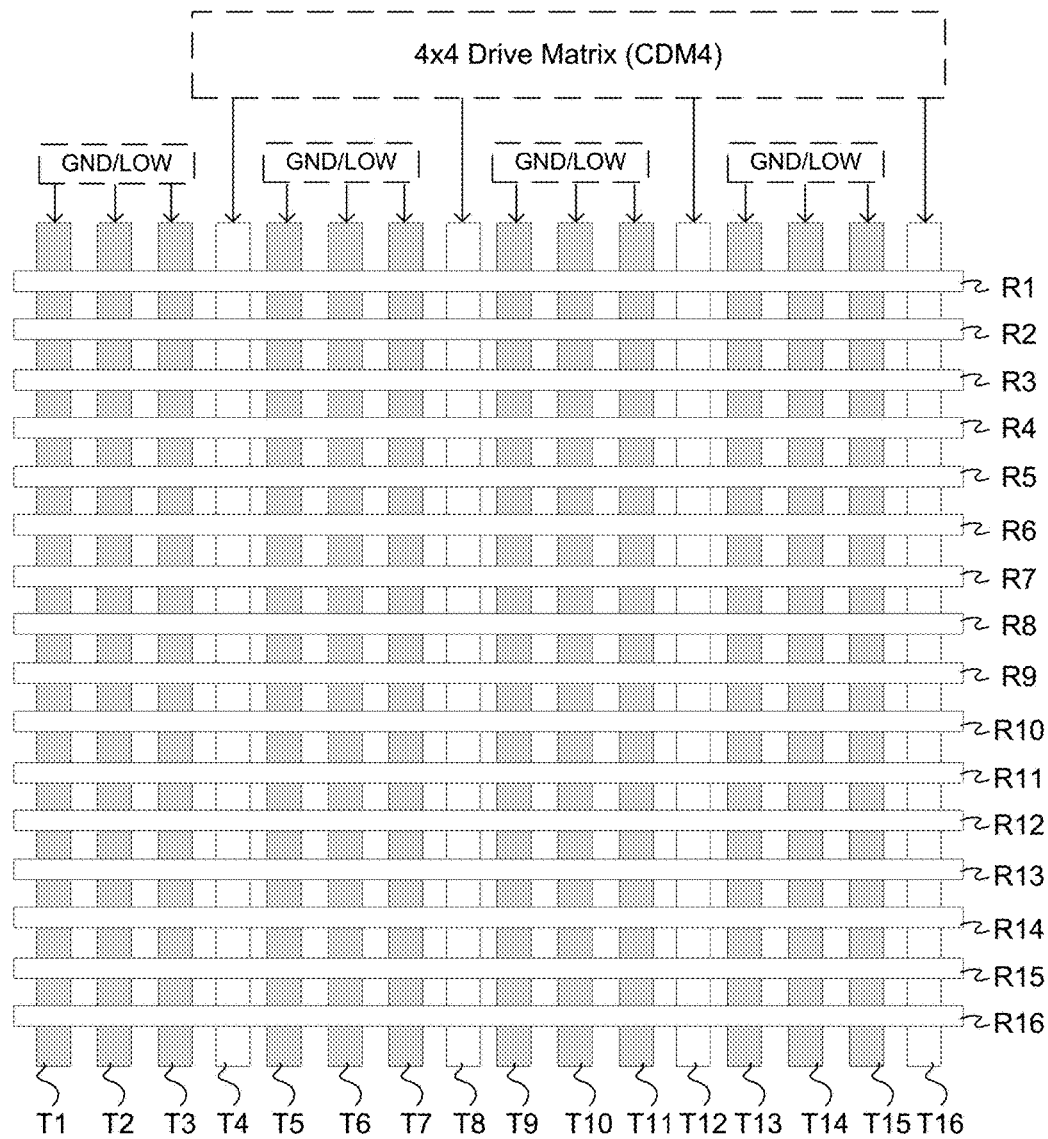

In particular, FIGS. 7A-7D depict an exemplary orthogonal grid of transmitter electrodes T1-T16 and receiver electrodes R1-R16 for a transcapacitive input device being driven via an example of a lower-order CDM technique using non-contiguous CDM groups. The example shown in FIGS. 7A-7D corresponds to a CDM order of 4 (CDM4) being used for 4 transmitter electrodes at a time for the 16×16 grid of transmitter electrodes. As shown in FIG. 7A, through a first set of four imaging iterations, corresponding to a 1$^{st}$ CDM group, the transmitter electrodes T1, T5, T9 and T13 are driven with transmitter signals having codings corresponding to a 4×4 drive matrix while the transmitter electrodes T2-T4, T6-T8, T10-T12 and T14-T16 are grounded or held at a low reference potential. As shown in FIG. 7B, through a second set of four imaging iterations, corresponding to a 2$^{nd}$ CDM group, the transmitter electrodes T2, T6, T10 and T14 are driven with transmitter signals having codings corresponding to a 4×4 drive matrix while the transmitter electrodes T1, T3-T5, T7-T9, T11-T13 and T15-16 are grounded or held at a low reference potential. As shown in FIG. 7C, through a third set of four imaging iterations, corresponding to a 3$^{rd}$ CDM group, the transmitter electrodes T3, T7, T11 and T15 are driven with transmitter signals having codings corresponding to a 4×4 drive matrix while the transmitter electrodes T1-T2, T4-T6, T8-T10, T12-T14 and T16 are grounded or held at a low reference potential. As shown in FIG. 7D, through a fourth set of four imaging iterations, corresponding to a 4$^{th}$ CDM group, the transmitter electrodes T4, T8, T12 and T16 are driven with transmitter signals having codings corresponding to a 4×4 drive matrix while the transmitter electrodes T1-T3, T5-T7, T9-T11 and T13-T15 are grounded or held at a low reference potential.

The 4×4 drive matrix corresponding to each of the CDM groups shown in FIGS. 7A-7D may be, for example:

$$\begin{bmatrix} 0 & 0 & 0 & 0 \\ +1 & +1 & -1 & -1 \\ +1 & -1 & +1 & -1 \\ -1 & +1 & +1 & -1 \end{bmatrix}$$

It will be appreciated that each row of the drive matrix corresponds to a different imaging iteration of the respective CDM group, and that the rows may be rearranged to be performed in any order. It will also be appreciated that the same 4×4 drive matrix may be used for each respective CDM group. Further, it will be appreciated that the 16 imaging iterations shown in FIGS. 7A-7D may be performed in any order.

It will further be appreciated that although the foregoing example sets forth a drive matrix with rowsum zero, these principles may also be used with respect to non-zero drive matrices. For example, in other exemplary embodiments, a CDM drive matrix may be constructed with codings having rowsum greater than zero, with different codings corresponding to the same constant non-zero rowsum being used throughout the different iterations corresponding to the CDM drive matrix.

Figure 8:
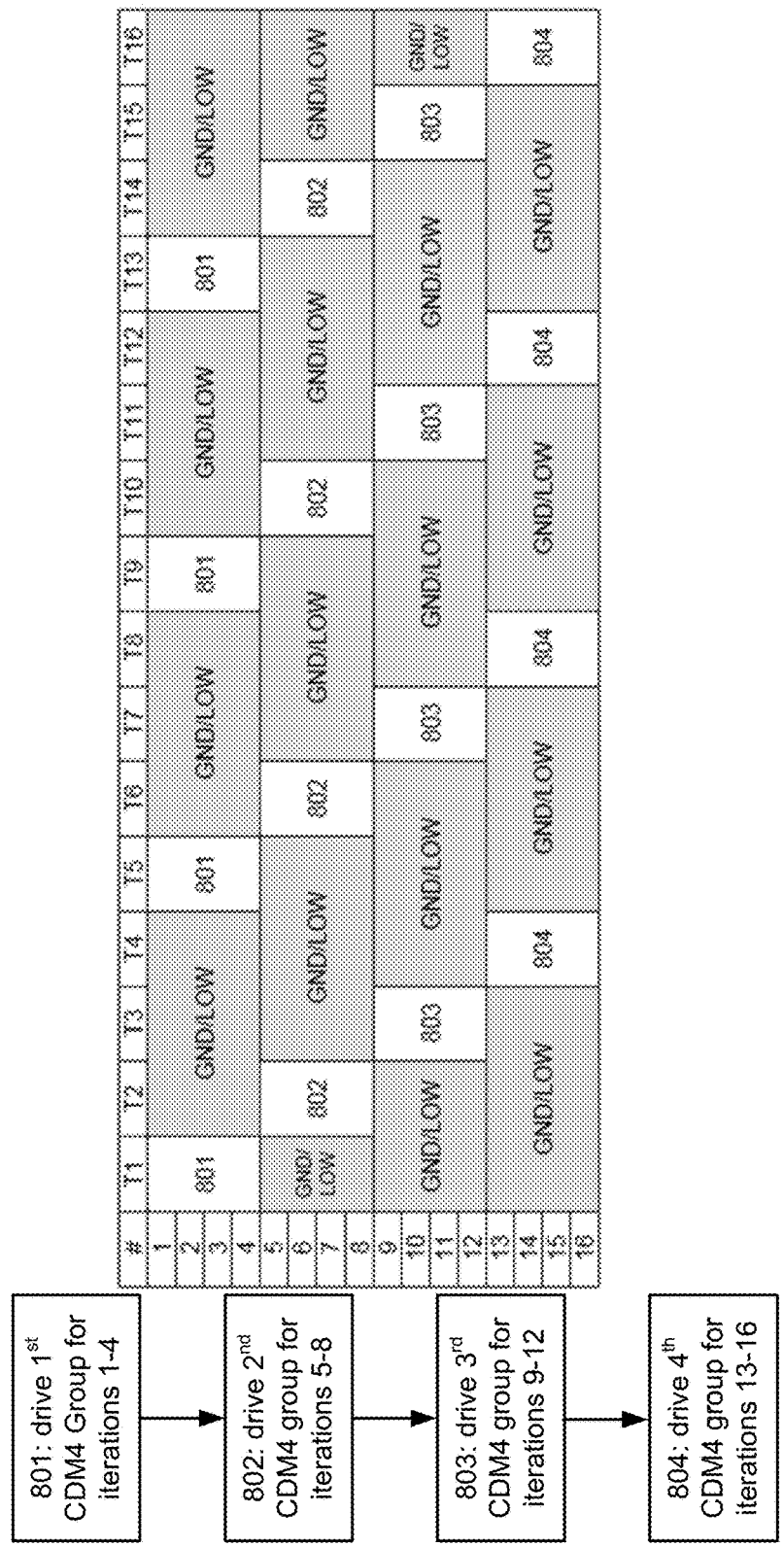
FIG. 8 is a flowchart with a corresponding table that schematically illustrates an example of the imaging iterations of FIGS. 7A-7D being performed in one exemplary sequence.

FIG. 8 is a flowchart with a corresponding table that schematically illustrates an example of the 16 imaging iterations of FIGS. 7A-7D being performed in one exemplary sequence. At stage 801, through a first set of four imaging iterations (1-4), a CDM4 drive matrix is applied to a 1$^{st}$ CDM group (transmitter electrodes T1, T5, T9 and T13). At stage 802, through a second set of four imaging iterations (5-8), a CDM4 drive matrix is applied to a 2$^{nd}$ CDM group (transmitter electrodes T2, T6, T10 and T14). At stage 803, through a third set of four imaging iterations (9-12), a CDM4 drive matrix is applied to a 3$^{rd}$ CDM group (transmitter electrodes T3, T7, T11 and T15). At stage 804, through a first set of four imaging iterations (13-16), a CDM4 drive matrix is applied to a 4$^{th}$ CDM group (transmitter electrodes T4, T8, T12 and T16).

The example shown above in FIGS. 7A-7D and FIG. 8 thus utilize lower-order CDM and achieve a reduction in peak power, reduction in average power, and a reduction in sensor self-heating, as well as a reduction in computational complexity for recovering the image from the detected resulting signals from the receiver electrodes, while additionally avoiding the appearance of seams. And, it will be appreciated that the number of CDM groups and the number of transmitter electrodes per CDM group may be adjusted in a flexibly configurable manner to meet the desired power specifications for various implementations of touch sensor devices and fingerprint sensor devices.

Figure 9:
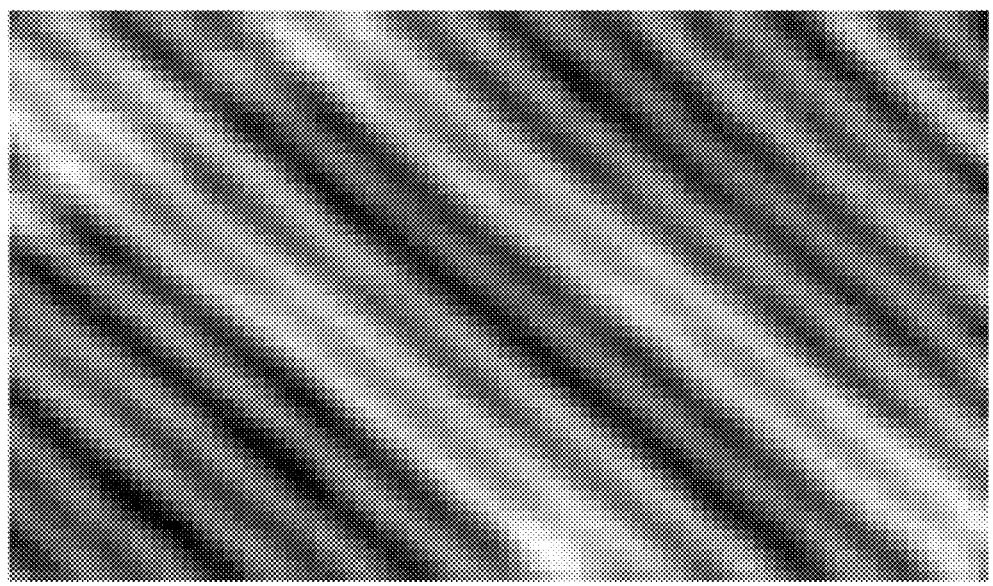
FIG. 9 is an exemplary image captured using lower-order CDM with six non-contiguous CDM16 groups for a 56×96 transcapacitive input device with 175 μm glass coating.

FIG. 9 is an exemplary image captured using lower-order CDM with six non-contiguous CDM16 groups for a 56×96 transcapacitive input device with 175 μm glass coating in a manner similar to the example discussed above with respect to FIGS. 7A-7D and FIG. 8 (which involved four non-contiguous CDM groups). As can be seen in FIG. 9, there are no image artifacts.

In some exemplary implementations, the drive matrices used in lower-order CDM in accordance with the foregoing examples may be a rowsum zero matrix, which is a matrix that contains all rows that have a sum of zero. An exemplary rowsum zero drive matrix A, when multiplied by its transpose D, results in a matrix with a diagonal of N−1 (wherein N is the CDM order) that is padded with −1. Thus, the drive matrix A adheres to the following equation:

$$D \cdot A = N * I_n - \text{Ones}$$

For example, for the exemplary row sum zero drive matrix discussed above with respect to FIGS. 4A-4D and FIGS. 7A-7D, $$\begin{bmatrix} 0 & 0 & 0 & 0 \\ +1 & +1 & -1 & -1 \\ +1 & -1 & +1 & -1 \\ -1 & +1 & +1 & -1 \end{bmatrix},$$

the following relationship exists:

$$\begin{bmatrix} 0 & +1 & +1 & -1 \\ 0 & +1 & -1 & +1 \\ 0 & -1 & +1 & -1 \\ 0 & -1 & -1 & -1 \end{bmatrix} \cdot \begin{bmatrix} 0 & 0 & 0 & 0 \\ +1 & +1 & -1 & -1 \\ +1 & -1 & +1 & -1 \\ -1 & +1 & +1 & -1 \end{bmatrix} = \begin{bmatrix} +3 & -1 & -1 & -1 \\ -1 & +3 & -1 & -1 \\ -1 & -1 & +3 & -1 \\ -1 & -1 & -1 & +3 \end{bmatrix}.$$

To determine an image value for each pixel, the following equation is used:

$$D \cdot A \cdot C_t$$

where $C_t$ is the transpose of a matrix corresponding to detected capacitance values corresponding to each pixel (x,y) of a sensing array of the transcapacitive input device (where x corresponds to a column index and y corresponds to a row index). Thus, for example, for a 4×4 drive matrix corresponding to the first CDM group depicted in FIG. 7A, $$C_t = \begin{bmatrix} C_{1,1} & C_{1,2} & \ldots & C_{1,16} \\ C_{5,1} & C_{5,2} & \ldots & C_{5,16} \\ C_{9,1} & C_{9,2} & \ldots & C_{9,16} \\ C_{13,1} & C_{13,2} & \ldots & C_{13,16} \end{bmatrix} \text{ and}$$

$$D \cdot A \cdot C_t = \begin{bmatrix} +3 & -1 & -1 & -1 \\ -1 & +3 & -1 & -1 \\ -1 & -1 & +3 & -1 \\ -1 & -1 & -1 & +3 \end{bmatrix} \cdot \begin{bmatrix} C_{1,1} & C_{1,2} & \ldots & C_{1,16} \\ C_{5,1} & C_{5,2} & \ldots & C_{5,16} \\ C_{9,1} & C_{9,2} & \ldots & C_{9,16} \\ C_{13,1} & C_{13,2} & \ldots & C_{13,16} \end{bmatrix}.$$

$(A \cdot C_t)$ corresponds to the measurements obtained by the transcapacitive input sensor, and the result of $D \cdot A \cdot C_t$ is a 4×16 matrix containing a pixel value for each pixel in the first CDM group. To provide one exemplary value:

$$\text{Pixel value } (1,1) = 3C_{1,1} - C_{5,1} - C_{9,1} - C_{13,1}$$
$$= 4C_{1,1} - 4 * (C_{1,1} + C_{5,1} + C_{9,1} + C_{13,1})/4$$
$$= 4C_{1,1} - 4\mu_{col1}$$

where $\mu_{col1}$ represents the average capacitance value for the first column of the transposed matrix of detected capacitance values in the first CDM group.

Thus, from the foregoing equations, it can be seen that the average capacitance across transmitter columns corresponding to a CDM group are removed when obtaining pixel values. The removal of the average capacitance is what causes the boundaries to appear in FIG. 6, and this can be avoided by using non-contiguous CDM groups as evidenced by FIG. 9.

The foregoing processes depicted in FIGS. 4A-4D and FIG. 5 and in FIGS. 7A-7D and FIG. 8 are examples of a method for performing transcapacitive sensing using a transcapacitive input device. The method may begin with receiving, at a sensing region of the transcapacitive input device, an input. Then, measurements are obtained via receiver electrodes of the transcapacitive input device, wherein obtaining the measurements includes: separately driving multiple subsets of transmitter electrodes of the transcapacitive input device, and obtaining measurements corresponding to each separately-driven subset of transmitter electrodes via the receiver electrodes. An image of the input is generated by a processing system of the transcapacitive input device based on the obtained measurements.

In certain exemplary embodiments, each separately-driven subset of transmitter electrodes comprises a plurality of non-contiguous transmitter electrodes, and a separately-driven subset of transmitter electrodes may be configured such that each non-contiguous transmitter electrode of the separately-driven subset of transmitter electrodes are not adjacent to any other non-contiguous transmitter electrode of the separately-driven subset of transmitter electrodes. (e.g., as depicted in FIGS. 7A-7D and FIG. 8). In other exemplary embodiments, each separately-driven subset of transmitter electrodes comprises a plurality of contiguous transmitter electrodes (e.g., as depicted in FIGS. 4A-4D and FIG. 5).

While measurements are obtained for a separately-driven subset of transmitter electrodes, other transmitter electrodes of the transcapacitive input device are grounded or held at a low reference potential (e.g., as depicted in FIGS. 4A-4D and FIG. 5, and in FIGS. 7A-7D and FIG. 8). And, in the case of having non-contiguous transmitter electrodes, at least one transmitter electrode that is grounded or held at a low reference is disposed between two non-contiguous transmitter electrodes of the separately-driven subset of transmitter electrodes while measurements are obtained for the separately-driven subset of transmitter electrodes (e.g., as depicted in FIGS. 7A-7D and FIG. 8).

A plurality of measurement iterations may be performed for a separately-driven subset of transmitter electrodes, the plurality of measurement iterations corresponding to a code division multiplexing (CDM) drive matrix for the separately-driven subset of transmitter electrodes. And, when generating the image, the inverse or the transpose of the CDM drive matrix may be utilized to obtain image information via decoding the obtained measurements corresponding to the separately-driven subset of transmitter electrodes. As mentioned above, the same CDM drive matrix may be used for each separately-driven subset of transmitter electrodes.

In certain exemplary embodiments, all measurement iterations for a first separately-driven subsets of transmitter electrodes are performed before any measurement iterations for a second separately-driven subsets of transmitter electrodes are performed (e.g., as depicted in FIGS. 4A-4D and FIG. 5, and in FIGS. 7A-7D and FIG. 8). In other exemplary embodiments, the measurement iterations may be performed in any order, including some measurement iterations for a first separately-driven subsets of transmitter electrodes being performed before and after measurement iterations for a second separately-driven subsets of transmitter electrodes.

In certain exemplary embodiments, the transmitter electrodes and the receiver electrodes are orthogonal to one another. For example, the transmitter electrodes and the receiver electrodes may be in a bars and stripes configuration or may be diamond electrodes in an orthogonal configuration.

In certain exemplary embodiments, the input is a biometric object and the generated image comprises features of the biometric object. For example, the input may be a fingerprint and the generated image may include ridges and valleys of the fingerprint.

Figure 10:
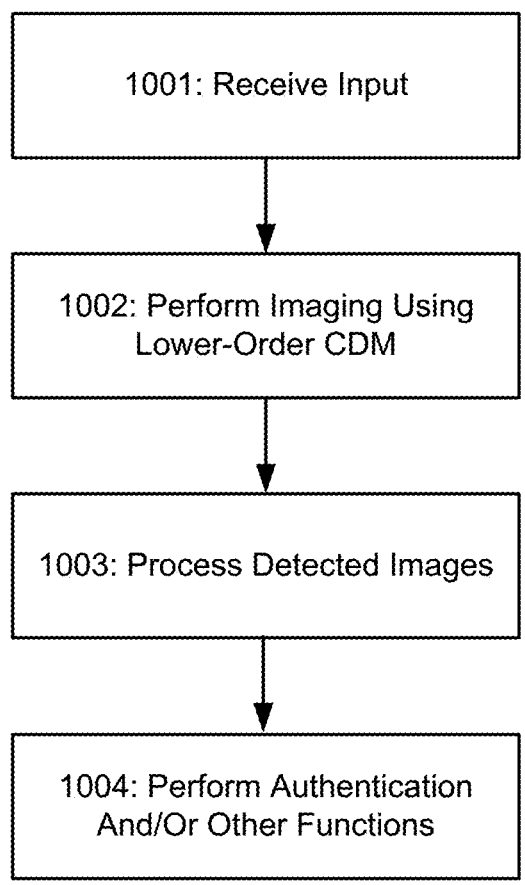
FIG. 10 is an exemplary flowchart depicting an exemplary process for using a transcapacitive input device.

FIG. 10 is an exemplary flowchart depicting an exemplary process for using a transcapacitive input device. At stage 1001, an input, such as a biometric object (e.g., a fingerprint), is received at a sensing region of the transcapacitive input device. At stage 1002, imaging is performed by the transcapacitive input device using lower-order CDM, for example, using a plurality of contiguous or non-contiguous CDM groups. The performed imaging may include, for example, a processing system decoding information obtained using the lower-order CDM techniques by using the inverse or transpose of a drive matrix corresponding to a CDM group. At stage 1003, the detected image may be processed further, if appropriate (e.g., to remove seams in the case of contiguous CDM groups being used). Then, at stage 1004, authentication and/or other functions (such as touch sensing, navigation functions, etc.) are performed by the processing system based on the detected and/or processed image.

It will be appreciated that although the illustrative examples discussed above are provided in the context of transcapacitive input devices, the principles described herein may also be applied to other types of input devices, such as acoustic or ultrasonic input devices, which also utilize transmitters and receivers. For example, the transmitters of an acoustic or ultrasonic input device may also be driven over multiple iterations using a lower-order CDM technique having non-contiguous CDM groups.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing input sensing using an input device, the method comprising:
    receiving, at a sensing region of the input device, an input, wherein the input device comprises a plurality of transmitters and a plurality of receivers;
    obtaining, via the plurality of receivers of the input device, measurements corresponding to the input, wherein obtaining the measurements comprises: separately driving multiple subsets of the plurality of transmitters, and obtaining measurements corresponding to each separately-driven subset of transmitters via the plurality of receivers, wherein each separately-driven subset of transmitters comprises a plurality of non-contiguous transmitters being driven over a plurality of iterations based on a drive matrix while all other transmitters of the plurality of transmitters are grounded or held at a low reference potential, and wherein at least one transmitter which is grounded or held at a low reference potential is disposed between two non-contiguous transmitters of each separately-driven subset of transmitters; and
    generating, by a processing system of the input device, an image of the input based on the obtained measurements corresponding to the input.

2. The method according to claim 1, wherein the drive matrix for each separately-driven subset of transmitters is a code division multiplexing (CDM) drive matrix.

3. The method according to claim 2, wherein generating the image utilizes an inverse or transpose of the CDM drive matrix for each separately-driven subset of transmitters to obtain image information via decoding the obtained measurements corresponding to each separately-driven subset of transmitters.

4. The method according to claim 2, wherein the same CDM drive matrix is used for multiple separately-driven subsets of transmitters.

5. The method according to claim 2, wherein all iterations for a first separately-driven subsets of transmitters are performed before any iterations for a second separately-driven subsets of transmitters are performed.

6. The method according to claim 1, wherein the transmitters and the receivers are orthogonal to one another.

7. The method according to claim 1, wherein the input is a biometric object and the generated image comprises features of the biometric object.

8. The method according to claim 1, wherein the input device is a transcapacitive input device, the plurality of transmitters are transmitter electrodes, and the plurality of receivers are receiver electrodes.

9. The method according to claim 1, wherein the input device is an acoustic or ultrasonic input device.

10. The method according to claim 1, wherein each non-contiguous transmitter for each separately-driven subset of transmitters is not adjacent to any other non-contiguous transmitter in the respective separately-driven subset of transmitters.

11. An input device, comprising:
    a surface corresponding to a sensing region, wherein the sensing region is configured to receive an input;
    a plurality of transmitters configured to be driven with transmitter signals; and
    a plurality of receivers configured to obtain measurements corresponding to the input, wherein obtaining the measurements comprises: obtaining measurements corresponding to separately-driven subsets of transmitters via the receivers, wherein each separately-driven subset of transmitters comprises a plurality of non-contiguous transmitters being driven over a plurality of iterations based on a drive matrix while all other transmitters of the plurality of transmitters are grounded or held at a low reference potential, and wherein at least one transmitter which is grounded or held at a low reference potential is disposed between two non-contiguous transmitters of each separately-driven subset of transmitters; and a processing system, configured to generate an image of the input based on the obtained measurements.

12. The input device according to claim 11, wherein the drive matrix for each separately-driven subset of transmitters is a code division multiplexing (CDM) drive matrix.

13. The input device according to claim 12, wherein generating the image utilizes an inverse or transpose of the CDM drive matrix for each separately-driven subset of transmitters to obtain image information via decoding the obtained measurements corresponding to each separately-driven subset of transmitters.

14. The input device according to claim 11, wherein the input device is a transcapacitive input device, the transmitters are transmitter electrodes, and the receivers are receiver electrodes.

15. A non-transitory computer-readable medium having processor-executable instructions stored thereon for performing input sensing using an input device, the processor-executable instructions, when executed, facilitating performance of the following:

obtaining, via receivers of the input device, measurements corresponding to an input received at a sensing region of the input device, wherein obtaining the measurements comprises: separately driving multiple subsets of transmitters of the input device, and obtaining measurements corresponding to each separately-driven subset of transmitters via the receivers, wherein each separately-driven subset of transmitters comprises a plurality of non-contiguous transmitters being driven over a plurality of iterations based on a drive matrix while all other transmitters of the plurality of transmitters are grounded or held at a low reference potential, and wherein at least one transmitter which is grounded or held at a low reference potential is disposed between two non-contiguous transmitters of each separately-driven subset of transmitters; and generating an image of the input based on the obtained measurements.

16. The non-transitory computer-readable medium according to claim 15, wherein the drive matrix for each separately-driven subset of transmitters is a code division multiplexing (CDM) drive matrix.

17. The non-transitory computer-readable medium according to claim 16, wherein generating the image utilizes an inverse or transpose of the CDM drive matrix for each separately-driven subset of transmitters to obtain image information via decoding the obtained measurements corresponding to each separately-driven subset of transmitters.

18. The non-transitory computer-readable medium according to claim 15, wherein the input device is a transcapacitive input device, the transmitters are transmitter electrodes, and the receivers are receiver electrodes.

* * * * *